US007065079B1

(12) United States Patent
Patra et al.

(10) Patent No.: US 7,065,079 B1
(45) Date of Patent: Jun. 20, 2006

(54) VC SHARING FOR MULTICAST IN A COMPUTER NETWORK

(75) Inventors: Abhijit Patra, Santa Clara, CA (US); Milton Xu, San Jose, CA (US); Peram Marimuthu, Sunnyvale, CA (US); Jeffrey Wang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/564,604

(22) Filed: May 4, 2000

(51) Int. Cl.
*H04L 12/56* (2006.01)
(52) U.S. Cl. .................. 370/390; 370/238.1; 709/238
(58) Field of Classification Search ............... 709/217, 709/238–244, 236; 370/352, 355, 390, 432, 370/270, 256, 395.1, 395.2, 395.3, 395.31, 370/395.5, 389, 238, 238.1; 379/88.17
See application file for complete search history.

(56) References Cited

U.S. PATENT DOCUMENTS

| 4,821,265 | A | 4/1989 | Albal et al. ................. 370/469 |
| 4,864,559 | A | 9/1989 | Perlman .................... 370/256 |
| 4,893,302 | A | 1/1990 | Hemmady et al. .......... 370/427 |
| 4,933,937 | A | 6/1990 | Konishi ...................... 370/404 |
| 5,018,137 | A | 5/1991 | Backes et al. .............. 370/401 |
| 5,027,350 | A | 6/1991 | Marshall .................... 370/401 |
| 5,088,032 | A | 2/1992 | Bosack ....................... 709/242 |
| 5,138,615 | A | 8/1992 | Lamport et al. ............ 370/400 |
| 5,140,585 | A | 8/1992 | Tomikawa ................... 370/354 |
| 5,274,631 | A | 12/1993 | Bhardwaj ................... 370/401 |
| 5,304,992 | A | 4/1994 | Harashima ............. 340/825.52 |
| 5,305,311 | A | 4/1994 | Lyles ......................... 370/390 |
| 5,313,454 | A | 5/1994 | Bustini et al. ............. 370/231 |
| 5,361,256 | A | 11/1994 | Doeringer et al. ......... 370/390 |
| 5,394,394 | A | 2/1995 | Crowther et al. .......... 370/392 |
| 5,394,402 | A | 2/1995 | Ross ......................... 370/256 |
| 5,402,415 | A | 3/1995 | Turner | |
| 5,414,704 | A | 5/1995 | Spinney ..................... 370/389 |

(Continued)

OTHER PUBLICATIONS

*Cisco 7000 Series Gains Fast Ethernet Interface, Becomes Only Router Family to Support Three High-Speed Network Types*,web, http://www.cisco.com/warp/public/146/199.html pp. 1-2.

(Continued)

*Primary Examiner*—John Pezzlo
(74) *Attorney, Agent, or Firm*—Cesari and McKenna LLP

(57) ABSTRACT

Only one point to multipoint virtual circuit (p2mp VC) is used within a router to handle all of the sources for a particular multicast group when other particulars of the multicast group are identical within that router. The router receiving a multicast packet for a particular multicast group identifies the source and the group number by reading fields of the incoming packet, identifies the input port of the router, and identifies the output port list. The input port of the router, the group number G, and the output port list are used by the router in establishing and identifying a point to multipoint VC within the router. The invention identifies all packets arriving at that particular input port, having the same multicast group number G, and having the same output port list, and transfers them to the identified VC. The VC is associated in the routing table with the output list of ports from which copies of the multicast packet are transmitted. Accordingly, only one VC is needed to transfer packets arising from any source of the multicast group so long as the multicast packets arrive on the same port of the router and have the same output port list.

26 Claims, 13 Drawing Sheets

U.S. PATENT DOCUMENTS

| | | | |
|---|---|---|---|
| 5,418,779 A | 5/1995 | Yemini et al. | 370/256 |
| 5,418,781 A * | 5/1995 | Kaufman et al. | 370/413 |
| 5,420,862 A | 5/1995 | Perlman | 370/401 |
| 5,430,715 A | 7/1995 | Corbalis et al. | 370/392 |
| 5,473,607 A | 12/1995 | Hausman et al. | 370/392 |
| 5,500,860 A | 3/1996 | Perlman et al. | 370/401 |
| 5,511,168 A | 4/1996 | Perlman et al. | 709/243 |
| 5,548,585 A | 8/1996 | Lagoutte et al. | 370/469 |
| 5,612,959 A | 3/1997 | Takase et al. | 370/390 |
| 5,617,421 A | 4/1997 | Chin et al. | 370/402 |
| 5,633,858 A | 5/1997 | Chang et al. | 370/255 |
| 5,633,869 A | 5/1997 | Burnett et al. | 370/396 |
| 5,636,216 A | 6/1997 | Fox et al. | 370/402 |
| 5,673,263 A | 9/1997 | Basso et al. | 370/396 |
| 5,684,797 A | 11/1997 | Aznar et al. | |
| 5,684,800 A | 11/1997 | Dobbins et al. | 370/401 |
| 5,740,171 A | 4/1998 | Mazzola et al. | 370/392 |
| 5,742,604 A | 4/1998 | Edsall et al. | 370/401 |
| 5,752,003 A | 5/1998 | Hart | 709/223 |
| 5,754,547 A | 5/1998 | Nakazawa | 370/401 |
| 5,764,636 A | 6/1998 | Edsall | 370/401 |
| 5,796,732 A | 8/1998 | Mazzola et al. | 370/362 |
| 5,796,740 A | 8/1998 | Perlman et al. | 370/401 |
| 5,822,523 A * | 10/1998 | Rothschild et al. | 709/236 |
| 5,835,720 A | 11/1998 | Nelson et al. | 709/224 |
| 5,854,901 A | 12/1998 | Cole et al. | 709/245 |
| 5,901,286 A | 5/1999 | Danknick et al. | 709/203 |
| 5,910,955 A | 6/1999 | Nishimura et al. | 370/401 |
| 5,968,126 A | 10/1999 | Ekstrom et al. | 709/225 |
| 5,982,773 A | 11/1999 | Nishimura et al. | 370/395 |
| 5,999,536 A | 12/1999 | Kawafuji et al. | 370/401 |
| 6,055,236 A | 4/2000 | Nessett et al. | 370/389 |
| 6,055,364 A | 4/2000 | Speakman et al. | |
| 6,078,590 A | 6/2000 | Farinacci et al. | |
| 6,101,180 A * | 8/2000 | Donahue et al. | 370/352 |
| 6,182,147 B1 | 1/2001 | Farinacci | |
| 6,212,182 B1 | 4/2001 | McKeown | |
| 6,216,167 B1* | 4/2001 | Momirov | 709/238 |
| 6,353,596 B1* | 3/2002 | Grossglauser et al. | 370/256 |
| 6,483,832 B1* | 11/2002 | Civanlar et al. | 370/390 |
| 6,484,209 B1* | 11/2002 | Momirov | 709/238 |
| 6,671,276 B1* | 12/2003 | Bakre et al. | 370/395.1 |
| 6,754,211 B1* | 6/2004 | Brown | 370/389 |

OTHER PUBLICATIONS

*ISL Functional Specification*, web, http://www.cisco.com/warp/public/741/4.htm, pp. 1-4.
*Configuring VTP and Virtual LANs*, Catalyst 5000 Series Software Configuration Guide, Chapter 13, pp. 13-24.
*IEEE Standard Project P802.1Q,Draft Standard for Virtual Bridged Local Area Networks,* Copyright by the Institute of Electrical and Electronics Engineers, Inc., Feb. 28, 1997, pp. 1-88.
*Draft Standard P. 802.1Q/D10, IEEE Standards for Local and Metropolitan Area Networks: Virtual Bridged Local Area Networks,* Copyright by the Institute of Electrical and Electronics Engineers, Inc., Mar. 22, 1998, pp. 1-212.
*ISL Configurations for Cisco IOS and the Catalyst 5000,* web, http://www.cisco.com/warp/public/741/8.html, pp. 1-8.
*Dynamic Inter-Switch Link Protocol,* 2.2 Configuration Note, pp. 2-6.
*Virtual LANs,* Catalyst 2820 Series and Catalyst 1900 Series Enterprise Edition Software Configuration Guide, Chapter 2, pp. 2.1-2.49.
IEEE, "Draft Standard for Virtual Bridged Local Area Networks," pp. 1-10 and 70-72 (May 1997).
Deering, S., and Cheriton, D., "Multicast Routing in Datagram Internetworks and Extended LANs," vol. 8, ACM Transactions on Computer Systems, pp. 85-110 (May 1990).
Deering, S. et al., "An Architecture for Wide-Area Multicast Routing," Proceedings of SIGCOMM '94 Conf., ACM, pp. 126-135 (Oct. 1994).
"Cisco VLAN Roadmap", http://www.cisco.com/warp/public/538/7.html, pp. 1-9, posted Jul. 17, 1995.
"Cisco Catalyst Workgroup Switch Version 3.0," http://www.cisco.com/warp/public/558/16.html, pp. 1-5, posted Aug. 29, 1994.
"Virtual Networking Services," http://www.cisco.com/warp/public/614/5.html, pp. 1-10, posted Oct. 28, 1997.
"Cisco LAN Switching Products," http://www.cisco.com/warp/public/534/16.html, pp. 1-21, posted Mar. 31, 1995.
"Multicast Routing," http://www.cisco.com/warp/public/614/17.html, pp. 1-3, posted Aug. 3, 1995.
"IP Multicast Streamlines Delivery of Multicast Applications," http://www.cisco.com/warp/public/674/4.html, pp. 1-4, posted Feb. 24, 1998.
"Catalyst 1200 Release 4.0," http://www.cisco.com/warp/public/558/49.html, pp. 1-7, posted May 18, 1995.
Cisco IOS VLAN Services, http://www.cisco.com/warp/public/614/11.html, pp. 1-3, posted Jan. 21, 1998.
"Cisco IOS Technologies," http://www.cisco.com/warp/public/732/ciscoios.html, pp. 1-2, 1997.
"The Virtual LAN Technology Report," http://www.3com.com/nsc/200374.html, pp. 1-19, 1998.
"ATM Internetworking," http://www.cisco.com/warp/public/614/12,html#LANE, pp. 1-58, posted Jun. 1, 1995.
Lucent's and Prominet's Motion for Leave To Amend Their Amended Complaint, with Exhibits being filed in *Lucent Technologies, Inc., and Prominet Corporation v. Cisco Systems, Inc. and Cisco Technology, Inc*.Civil Action No. 98-349 (JJF).
"Cisco Announces New Fast Ethernet Interface," Communications Industry Researchers, Broadband Networks and Applications, Apr. 15, 1995.
Lucent Technologies, Inc.'s Initial Disclosure of Prior Art under Civil Local Rule 16-7, dated Nov. 18, 1998.
"Cisco Introduces VLAN Solution," Communications Industry Researchers, Broadband Networks and Applications, Apr. 15, 1995.
"Cisco Announces Token-Ring Switching Products," Communications Industry Researchers, Broadband Networks and Applications, Apr. 15, 1995.
"Chipcom and Cisco To Collaborate On ATM Networking Solutions," Communications Industry Researchers, Broadband Networks and Applications, Apr. 15, 1995.
Estrin et al., RFC 2117 Protocol Independent Multicast-Sparse Mode (PIM-SM): Protocol Specification, Jun. 1997, pp. 1-66.
Farinacci et al., RFC 2337 Intra-LIS IP Multicast Among Routers Over ATM Using Sparse Mode PIM, Apr. 1998, Copyright 1998 The Internet Society, pp. 1-8.
Estrin, et al., RFC 2362 Protocol Independent Multicast-Sparse Mode (PIM-SM): Protocol Specification, Jun. 1998, Copyright Jun. 1998 The Internet Society, pp. 1-66.

* cited by examiner

500

O-LIST VS PORTS

| O-LIST ID | PORTS |
|---|---|
| | |
| O-1 | PORT1, PORT4, PORT21, · · · |
| O-1 | PORT30, PORT52, PORT61, · · · |
| | |

502 → (O-1 row); 504 → (PORT1...); 506 → (O-1 row); 508 → (PORT30...); 510, 512

MULTICAST ROUTING TABLE

| INCOMING PORT | SOURCE S | GROUP G | O-LIST | p2mp VC | |
|---|---|---|---|---|---|
| | | | | | |
| P11 | S23 | G5 | O-17 | p2mp VC7 | |
| | | | | | |
| P13 | S51 | G-7 | O-21 | p2mp VC22 | ~544 |
| P13 | S52 | G-7 | O-21 | p2mp VC22 | ~546 |
| P13 | S53 | G-7 | O-21 | p2mp VC22 | ~548 |
| P13 | S54 | G-7 | O-21 | p2mp VC22 | ~550 |
| P13 | S55 | G-7 | O-21 | p2mp VC22 | ~552 |
| P13 | S56 | G-7 | O-21 | p2mp VC22 | ~554 |
| | ⋮ | | | p2mp VC22 | ~560 |

600
MULTICAST ROUTING TABLE

| INCOMING PORT | SOURCE S | GROUP G | O-LIST | p2mp VC | |
|---|---|---|---|---|---|
| | | | | | |
| P13 | S51 | G-7 | O-21 | p2mp VC-31 | ~611 |
| P13 | S52 | G-7 | O-21 | p2mp VC-32 | ~613 |
| P13 | S53 | G-7 | O-21 | p2mp VC-33 | ~615 |
| P13 | S54 | G-7 | O-21 | p2mp VC-34 | ~617 |
| P13 | S55 | G-7 | O-21 | p2mp VC-35 | ~619 |
| P13 | S56 | G-7 | O-21 | p2mp VC-36 | ~620 |
| | | | | | |
| 602 | 604 | 606 | 608 | 610 | |

FIG. 6
PRIOR ART

VC SHARING FOR MULTICAST IN A COMPUTER NETWORK

BACKGROUND OF THE INVENTION

1. Field of the Invention

This invention relates to switching multicast packets, and more particularly to switching multicast packets by a router.

2. Background Information

In multicast routing, it is standard engineering practice for a router to receive a multicast packet in a flow on an input port and to transmit copies of the packet on multiple output ports. A flow is identified by the contents of specified fields in the packet header, for example: the Layer 2 source and destination addresses and protocol field; the Layer 3 source and destination addresses; the input port of the router and the list of output ports through which the outgoing multicast packets are to be transmitted, etc. A multi-cast flow can be identified by the source end node and a group number. A shorthand notation for designating such a multicast group flow is (S,G). Here S stands for the IP source address of the source end node of the flow, and "G" stands for the group number, as represented in the IP destination address.

The router creates entries in its multicast routing table for each source and group combination is, each (S,G). The (S,G) routing entry contains information on entry points to an "output list" of interfaces. A copy of the multicast packet is transmitted from each interface on the output list. For a virtual circuit (VC) based routing system, the router can use a point-to-multipoint virtual circuit (p2mp VC) to internally route the multicast packets from the input port to the various output ports on the output list for the particular group. Each multicast flow is identified by its (S,G) pair. Thus in a router, each (S,G) pair has its associated p2mp VC.

When a multicast group has many source end nodes, each source of the group is also identified by a (S,G) pair. Each (S,G) pair requires a p2mp VC within the router to direct the multicast packets through the router from the input port to the ports on the output list for that multicast flow.

Some types of multicast groups may have thousands of sources. For example, interactive television conference systems have a source from which the television broad-cast originates, and has thousands of receivers. However, each of the receivers is also a transmitter and can send packets to the same multicast group address. Thus, each of the receivers is both a receiver and a multicast source. So, for each source, a router that is based on VC architecture must use a p2mp VC resource for the group as it routes the packets coming from the thousands of sources.

Each p2mp VC within a router requires resources, as each p2mp VC requires a table giving its particulars. The tables must be maintained in memory within, for example, silicon memory chips. Memory is expensive, and so the number of p2mp VCs which a router can support is limited. For example, a particular router may be able to support only about several thousand of p2mp VCs, for a particular port, devoted to multi-cast transmission, where it is desired to have an interactive television system capable of supporting ten times this number of participants which are both receivers and transmitters.

There is needed a method for a VC based router to support group multicast, where the group has thousands of sources and the router is limited to fewer p2mp VCs than sources.

SUMMARY OF THE INVENTION

The invention is a method of using only one point to multipoint virtual circuit (p2mp VC) within a VC based router to handle all of the sources for a particular multi-cast group when other particulars of the multicast group are identical within that router. The router receiving a multicast packet for a particular multicast group identifies the source and the group number by reading fields of the incoming packet, identifies the input port of the router, and identifies the output port list. The input port of the router, the group number G, and the output port list are used by the router in establishing and identifying a p2mp VC within the router. The invention identifies all packets arriving at that particular input port, having the same multicast group number G, and having the same output port list, and transfers them to the identified p2mp VC. The p2mp VC is associated in the routing table with the output list of ports from which copies of the multicast packet are transmitted. Accordingly, only one p2mp VC is needed to transfer packets arising from any source of the multicast group so long as the multicast packets arrive on the same port of the router and have the same output port list.

In shorthand notation, only one VC is needed for a multicast group identified as (S,G)/(*,G) for all packets of the group arriving at a particular port of the router. In the shorthand "S" is the source end node IP address, "G" is the group number. (S,G) is used to represent a source based multicast delivering tree, while (*,G) is used to represent a shared delivering tree.

BRIEF DESCRIPTION OF THE DRAWINGS

Turning now to the drawings, in which like numerals represent like parts in the several views.

FIG. 5A is a table correlating an O-List with a list of ports;

FIG. 5B is a table showing assignment of a p2mp VC, in accordance with the invention;

FIG. 6 is a table showing assignment of a p2mp VC under the prior art;

DETAILED DESCRIPTION OF AN ILLUSTRATIVE EMBODIMENT

Figure 1:
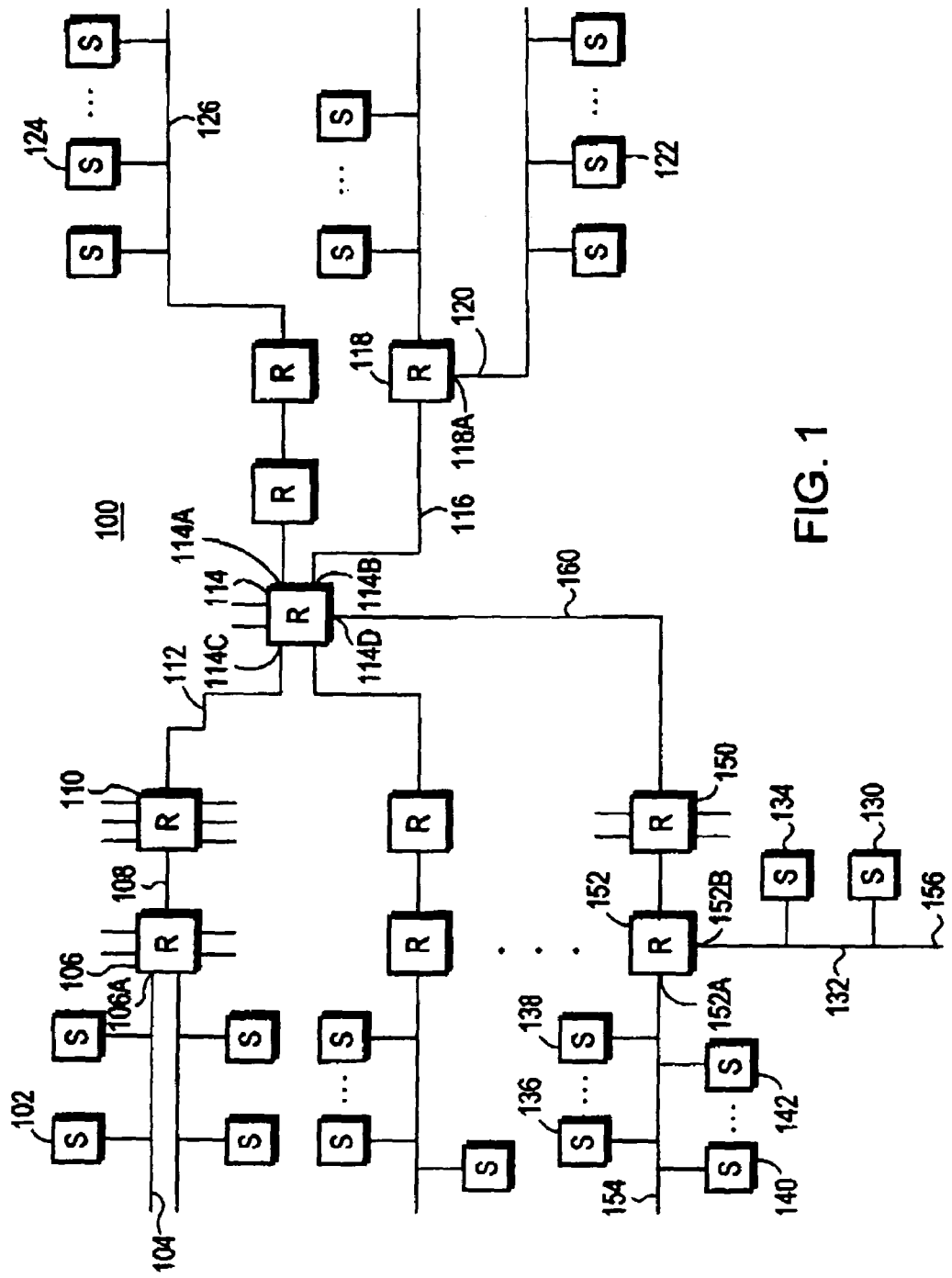
FIG. 1 is a block diagram of computer network.

Turning now to FIG. 1, computer network 100 is shown with a plurality of routers "R", and a plurality of end stations "S" connected to local area networks (LANs). The LANs each connect to a router at a port of the router. The routers are interconnected to form a network so that a message transmitted by any one of the source end stations S may be received by any other of the end stations. For example, a message transmitted by end station 102 is transmitted onto LAN 104. LAN 104 is connected to router 106 at its port 106A. Router 106 is connected through link 108 to router 110. Router 110 is connected through link 112 to router 114. Router 114 is connected by link 116 to router 118. Router 118 is connected to local area network 120 at port 118A of router 118. End station 122 is connected to LAN 120.

A unicast message transmitted by end station 102 and addressed to end station 122 will travel through local area network 104, router 106, router 110, router 114, router 118, and finally through local area network 120 from which the message is received by end station 122. Also, a unicast message may be transmitted by end station 122 and travel in the reverse direction to end station 102. For example, a message from end station 122 is launched onto local LAN 120, travels through router 118, through router 114, through Router 110, and finally through router 106, where it is launched onto LAN 104 from which it is received by end station 102.

A multicast transmission may be made by an end station S to a plurality of receiving end stations. For example, end station S may transmit a multicast message designating a selected number of other end stations as receiving stations. The transmitting station and receiving stations are said to belong to a "multicast group" of stations for receipt of the multicast transmission. For example, station 102 may transmit a multi-cast message for which station 122 is a member of the multicast group. For example, station 124 on LAN 126 is a member of the multicast group, and also for example, station 130 on LAN 132 is a member of the multicast group.

As an example, to illustrate the necessity of the present invention, it is assumed that a plurality of stations connected to a particular port of router 114 are members of the multicast group. For example, end station 134, end station 136, end station 138, end station 140, and end station 142 are all assumed to be members of the multicast group. Thus, when transmitting end station 102 transmits a multicast message to the multi-cast group, the message travels through router 106, router 110, router 114, router 150, and router 152. Router 152 transmits the multicast message through its port 152A to LAN 154. End station 136, end station 138, end station 140, end station 142, etc. receive the multicast message for the multicast group from LAN 154. Also, router 152 transmits the multicast message through its port 152B onto local area network LAN 156. End station 130 and end station 134 receive the multicast group message from LAN 156.

Link 160 connects router 150 to port 114D of router 114. Any multicast packet of the multicast group transmitted by an end station through router 150 enters router 114 through port 114D from link 160.

In many computer networks any station receiving a multicast group message may transmit a response to the multicast group message, where the response is received by all members of the group. That is, for example, end station 140 may transmit a response to a particular multicast group message. All of the end stations belonging to that multi-cast group will receive the response, as the response is transmitted by end station 140 as a multicast message within the multicast group. That is end stations 136, 138, 142, 130, 134, will receive the multicast group message, as well as the multicast group message being routed by router 150 to router 114, and router 114 routing the message to each of its ports through which it reaches a member of the multicast group. For example, router 114 will transmit the multicast group message transmitted by end station 140 through its port 114A so that end station 124 may receive the multicast group message. Also, Router 114 will transmit the multicast group message through its port 114B so that end station 122 will receive the multicast group message. Further, Router 114 will transmit the multi-cast group message through its port 114C so that end station 102 may receive the multi-cast group response as transmitted by end station 140.

Further, each of the end stations in the multicast group may transmit a response multicast message to the same multicast group, and that response multicast message is routed to all members of the multicast group.

Router 114, in the topology shown in FIG. 1, routes the original multicast message transmitted by end station 102 to all of its ports having members of the group connected thereto, such as, for example, port 114a, 114b, 114d. Also router 114 routes all of the multicast messages transmitted by any of the members of the group as response messages, and routes them to all other members of the group.

In the prior art, a router routing multicast group messages dedicates an internal virtual circuit (VC) for each flow of the multicast group. A flow may be identified by the ordinary five tuple of fields of a message, (MAC DA and SA, IP SA and DA, and L2 "type" field) and in addition the receiving of the router and the multicast group number. Accordingly, router 114, in the prior art, must assign a different virtual circuit (VC) for each source end station transmitting a multicast message in the multicast group. That is, when a large number of source end stations exist in a multicast group, a router such as router 114 routing all of the multicast group messages must assign different virtual circuits for each source end station in the group.

The Protocol Independent Multicast (PIM) protocol is described in RFC 2117, RFC 2337, and RFC 2362, all disclosures of which are incorporated herein by reference. An RFC is a request for comments published by the Internet Engineering Task Force (IETF). RFC documents are published on the IETF web page at the URL: http:\\www.ietf.org.

In accordance with the PIM protocol, a multicast flow is designated by two parameters, the source end station Layer 3 address and the multicast group number. The PIM protocol is used to build a multicast delivering tree within the network to route multi-cast packets from a source station to its receivers. (S,G) is used to represent a source based shortest path tree. (*,G) is used to represent a shared tree. In a shared tree mechanism, the first hop routers to the sources send multicast packets to a rendezvous point first, and the rendezvous point is the root of the delivering tree to all of the receivers. The PIM RFC documents mentioned above give details of multicast delivery mechanisms. A multicast flow with many sources, and so a long output port list in many routers, is identified by the symbol (S,G) where S has different values for different sources.

Figure 2:
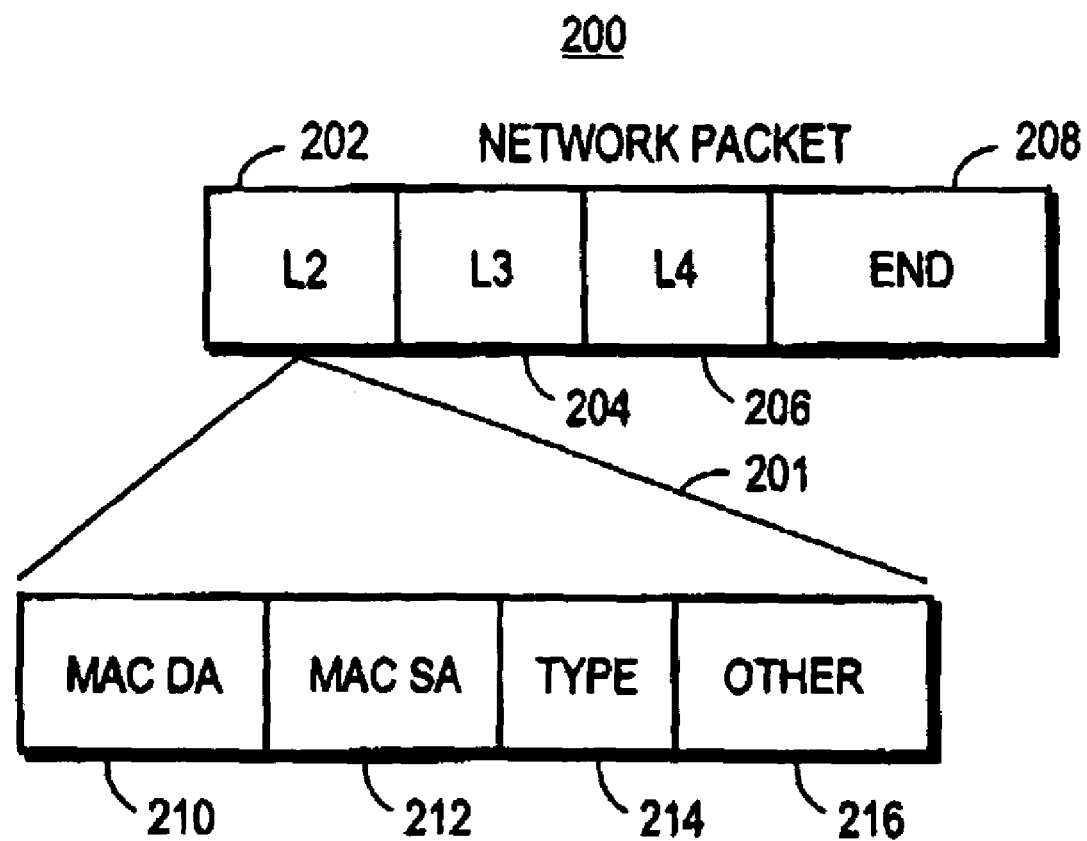
FIG. 2 is a block diagram of fields of a packet, showing detail of the L2 fields.

Turning now to FIG. 2, network packet 200 is shown. Network packet 200 has the Layer 2 header 202, the Layer 3 header 204, the Layer 4 fields 206, and the end fields 208.

The Layer 2 fields 202 of network packet 200 are broken out in FIG. 2, as shown by break out lines 201. The Layer 2 destination address field 210 is also referred to as the MAC destination address field (MAC DA). The Layer 2 source address field 212 is also referred to as the MAC source address field (MAC SA). "Type" field 214, and other fields 216 designate various features of a Layer 2 header, as described in detail in the book by Radia Pearlman in her book Interconnections second Edition, Published by Addison Wesley, Copyright 2000, all disclosures of which are incorporated herein by reference, particularly pages 25–38.

Figure 3:
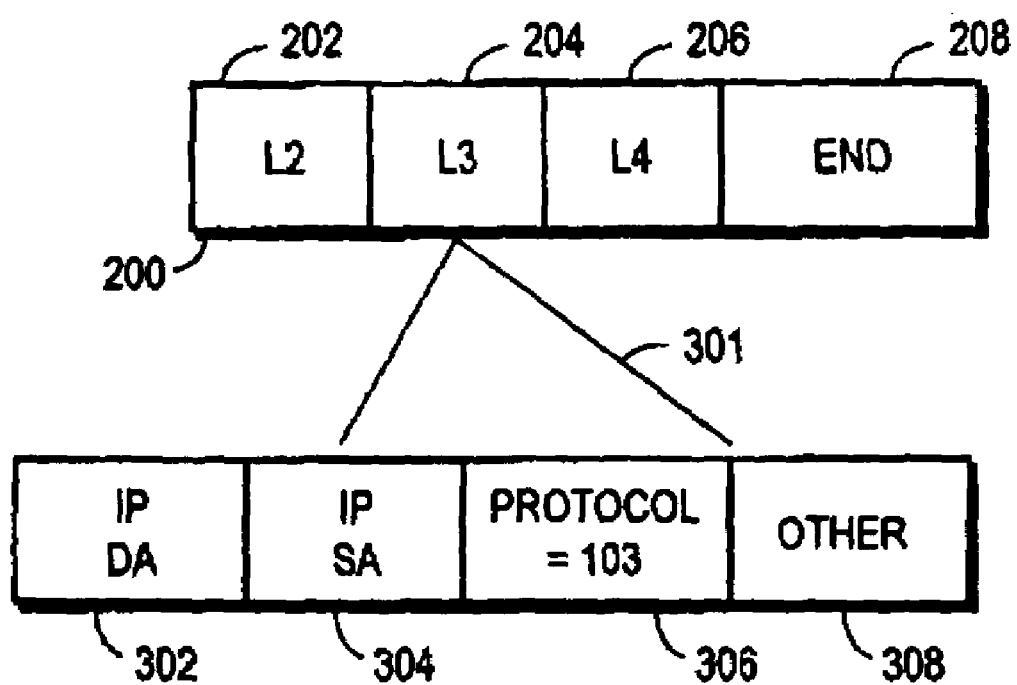
FIG. 3 is a block diagram of a packet, showing details of Layer 3 fields of the packet.

Turning now FIG. 3, the network packet with fields 202, 204, 206, and 208 is shown. Also, the Layer 3 header fields 204 are broken out as shown by break out lines 301. The network header field 204 contains the fields designated by break out lines 301. The Layer 3 address field 302 is also referred to as the IP destination address or (IP DA) field. The Layer 3 source address field 304 is also referred to as the IP SA field. The Layer 3 protocol field 306 designates a protocol for the packet. For example, a multi-cast routing packet using the PIM protocol as described in RFC 2117 or RFC 2362 uses a number "103" in protocol field 306, as described in paragraph 4 of RFC 2362. Field 308 contains other fields of the L3 header, if any.

Figure 4:
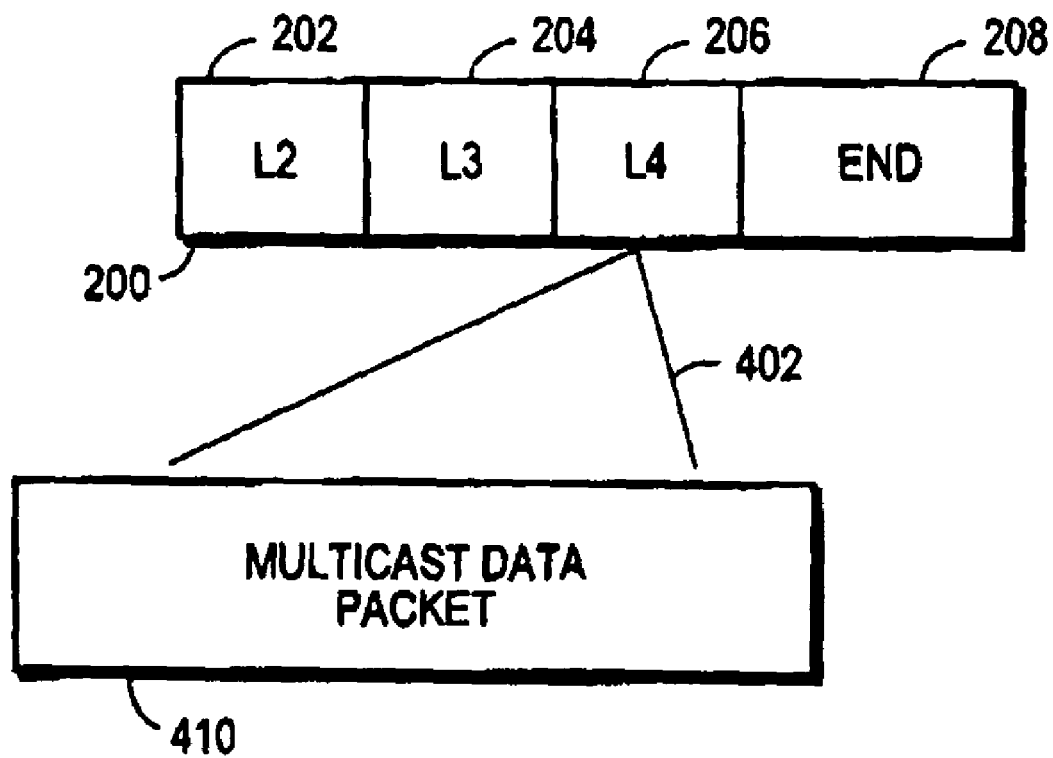
FIG. 4 is a block diagram of fields of the packet showing the multicast data packet in layer 4.

Turning now to FIG. 4, network packet 200 is shown with the Layer 4 fields 410 shown holding the multicast data.

Turning now to FIG. 5A, O-List versus Ports Table 500 is shown. Column 510 contains entries for Output Port Lists (O-Lists), and specifically the entries in column 510 are indicia for the various O-Lists. Column 512 contains entries for the list of ports associated with the Output Port List whose indicia is given in column 510. O-List versus Ports Table 500 gives a correlation between an Output Ports List (O-List) and the specified output ports. For example, entry 502 for O-List 1 (O-1) lists the associated ports used as output ports for O-1 in entry 504, and the exemplary ports are: Port-1, Port 4; Port-21, . . . etc. As a second example, entry 506 for O-List 7 lists the associated ports used as output ports for O-7 in entry 508, and the exemplary ports are: Port-30; Port 52; Port 61; . . . etc.

Turning now to FIG. 5B, Multicast Routing Table 520 is shown. Routing Table 520 has entries in various columns as follows. Column 522 contains entries for the incoming port at which an incoming multicast packet was received by the router. Column 524 contains entries for the source end station "S" determined by reading the Layer 3 source address (IP SA) field 304 of the incoming multicast packet. Column 526 contains an entry for the multicast group number "G" determined by reading the Layer 3 destination address (IP DA) field 302 of the incoming multicast packet. Column 528 contains the Output Port List (O-List) assigned to the S and G combination. Table 5A then gives the actual ports through which replicated copies of the incoming multicast packet are to be transmitted by the router, for the particular value of O-List indicia entered in column 528. Column 530 contains the internal point to multipoint virtual circuit (p2mp VC) used by the router in replicating the incoming multicast packet and transmitting it out through the ports of the O-List entered in column 528.

Typical exemplary entries in Multicast Routing Table 520 are next described. At entry 540 the exemplary incoming multicast packet was received at port P 11. The source address S read from multicast packet IP SA field 304 is source S 23. The multi-cast group number read from multicast packet IP DA field 302 is group G5. The Output Port List, O-List, is O-17. The p2mp VC used by the router to replicate the incoming multicast packet and transmit it out to the ports in O-List O-17 is p2mp VC-7.

As a second example, entries 542 give the p2mp VC assignments for exemplary multicast packets arriving from a large number of different source end stations S, where the multicast packets all are for the same multicast group, the same input port, and the same Output Port List (O-List). For example, at entry 544 the incoming multicast packet arrives at port P-13. The source end station S determined by reading IP SA field 304 is station S 51. The multicast group G determined by reading IP DA field 302 is group G 7. The output port list assigned to this S and G combination, S-51, G-7, is O-21. The p2mp VC assigned to this multicast packet is p2mp VC-22.

At entry 546 the incoming port is again P-13. However the source end station is determined to be S-52 by reading IP SA field 304. The multicast group is again group G-7. The output port list is again O-21. The p2mp VC assigned to this source and group combination S-52, G-7 is again p2mp VC-22.

At entry 548 the incoming port is again P-13. However the source end station is determined to be S-53 by reading IP SA field 304. The multicast group is again group G-7. The output port list is again O-21. The p2mp VC assigned to this source and group combination S-52, G-7 is again p2mp VC-22.

At entry 550 the incoming port is again P-13. However the source end station is determined to be S-54 by reading IP SA field 304. The multicast group is again group G-7. The output port list is again O-21. The p2mp VC assigned to this source and group combination S-52, G-7 is again p2mp VC-22.

At entry 552 the incoming port is again P-13. However the source end station is determined to be S-55 by reading IP SA field 304. The multicast group is again group G-7. The output port list is again O-21. The p2mp VC assigned to this source and group combination S-52, G-7 is again p2mp VC-22.

At entry 554 the incoming port is again P-13. However the source end station is determined to be S-56 by reading IP SA field 304. The multicast group is again group G-7. The output port list is again O-21. The p2mp VC assigned to this source and group combination S-52, G-7 is again p2mp VC-22.

Three dots 556 indicate that a large number of different source end stations S which have the same incoming port, and the same multicast group G, and the same output port list, are assigned by the invention to the same point to multipoint virtual circuit, that is the same p2mp VC indicated in column 530 entries, at entry 560. For example, there may be 100 different source stations, 1,000 different source stations, or millions of source stations, all with the same multicast group G, and all arriving at the same input port of the router, and all will be handled by the router using only one point to multipoint virtual circuit, p2mp VC.

As shown in Multicast Routing Table 520, each combination of different source station S, all with a common multicast group G arriving at the same input port then points to the same "point to multipoint VC" (p2mp VC). In contrast, in the prior art, a multi-cast group G with a 1,000 source stations, or a 1,000,000 source stations, requires the same number of point to point virtual circuits (p2mp VCs), as the number of source end stations.

Turning now to FIG. 6, a prior art method, also known as the "traditional method", of routing multicast packets through a router is shown in Table 600. As shown in column 602 each of the incoming multicast packets at port P-13 have a different source end station determined by reading IP SA field 304, as shown in column 604. Each of the incoming multicast packets has the same multicast group number G-7 determined by reading IP DA field 302, as shown in column 606. Each of the incoming multicast packets has the same output port list O-21, as shown in column 608. Each of the incoming multi-cast packets is assigned to a different point to point multicast virtual circuit, as shown in column 610. In the example shown in Prior Art Multicast Routing Table 600, the multi-cast packet having source S51 in entry 611 has p2mp VC 31. The multicast packet having source S52 in entry 613 has p2mp VC 32. The multicast packet having source S53 in entry 615 has p2mp VC 33. The multicast packet having source S54 in entry 617 has p2mp VC 34. The multicast packet having source S55 in entry 619 has p2mp VC 35. The multicast packet having source S56 in entry 620 has p2mp VC 36.

An important contrast between the present invention and the prior art shown in FIG. 6 is that the prior art requires a different p2mp VC for every source station contributing to a multicast group. In a situation such as interactive conferencing, or interactive broadcasting, the number of source stations may be in the thousands, or in the millions, etc. each source station, in the prior art, requires its own p2mp VC. In contrast, all source stations for the group having packets entering the router at a particular port are handled by the invention using only one p2mp VC. Referring now to FIG. 1, for example, all packets entering router 114 at port 114C from link 160 for a particular multicast group are routed by the invention by only one p2mp VC, no matter how many source end stations send the packets through link 160, as long as all source end stations use the same O-List.

Figure 7:
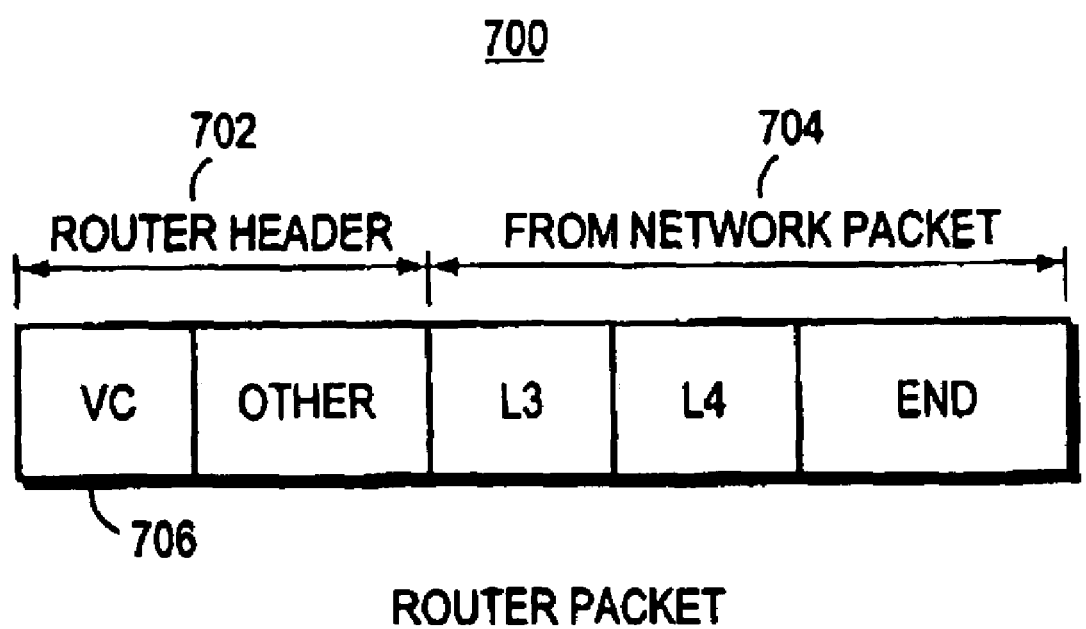
FIG. 7 is a block diagram of a packet within a VC based router.

Turning now to FIG. 7, router packet 700 is shown. When a network packet is received by a router, internally the router removes the Layer 2 field 202. In many router designs, as the packet is transferred internally in the router from one location to the next, the packet has appended thereto a router header set of fields as is shown is FIG. 7. Packet fields 704 of the router packet are maintained identical to Layer 3 fields 204 and Layer 4 fields 206 of the received network packet. Field 706 contains a virtual circuit number assigned by the router for convenience in transfer of the packet from the receiving port to the output ports designated for that multicast group. The virtual circuit number has associated with it a routing table listing ports of the router through which the packet is to be transmitted, the output port list.

In the present invention one virtual circuit is used for all flows designated as (S,G) or (*,G) arriving at a particular port for a particular multicast group and going out through the same outgoing ports. The virtual circuit is the p2mp VC.

Figure 8:
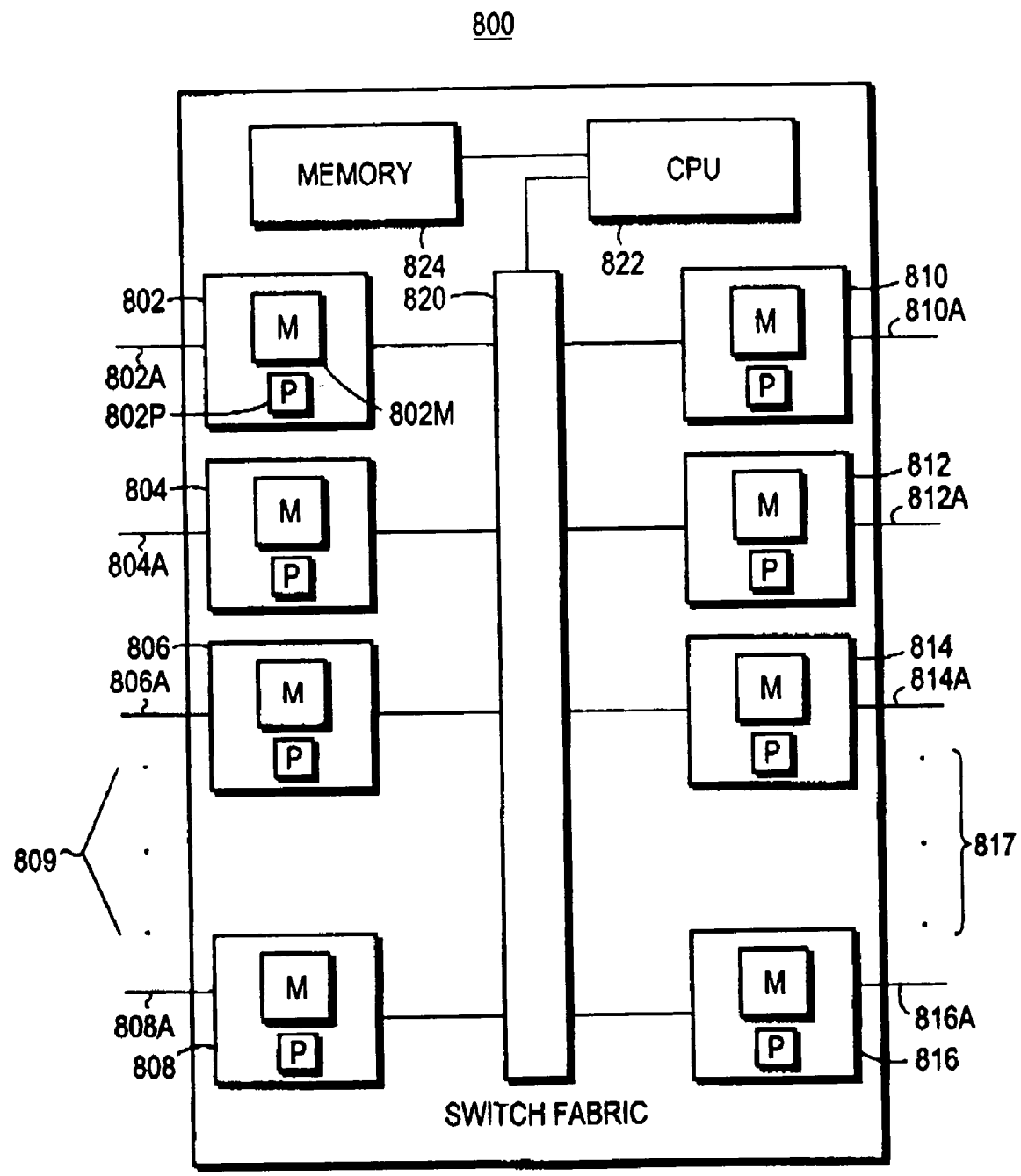
FIG. 8 is a block diagram of hardware of a VC based router.

Turning now to FIG. 8, block diagram 800 of a representative structure for internal operation of a router using point to multipoint virtual circuits, p2mp VC, is shown. Each linecard 802, 804, 805, . . . 808, 810, 812, 814, 816 supports a port. For example, line-card 802 has port 802A; linecard 804 has port 804A; linecard 806 has port 806A, . . . and line-card 816 has port 816A, etc. Each linecard has a memory unit M. For example, representative linecard 802 has memory unit M 802M, and each of the linecards has a memory unit M. Each line card has a processor P. For example, representative linecard has processor P 802P, and each of the linecards has a processor P. The various linecards are interconnected by switch fabric 820. Switch fabric 820 may be implemented using a cross bar switch, by using an ATM type fabric, etc. Switch fabric 820 supports point to multi-point virtual circuits, p2mp VCs. For example, switch fabric 820 supports p2mp VCs as indicated in prior art routing table 600. A central processor CPU 822 operationally connects with each of the line cards. CPU 822 has memory unit 824.

Figure 10:
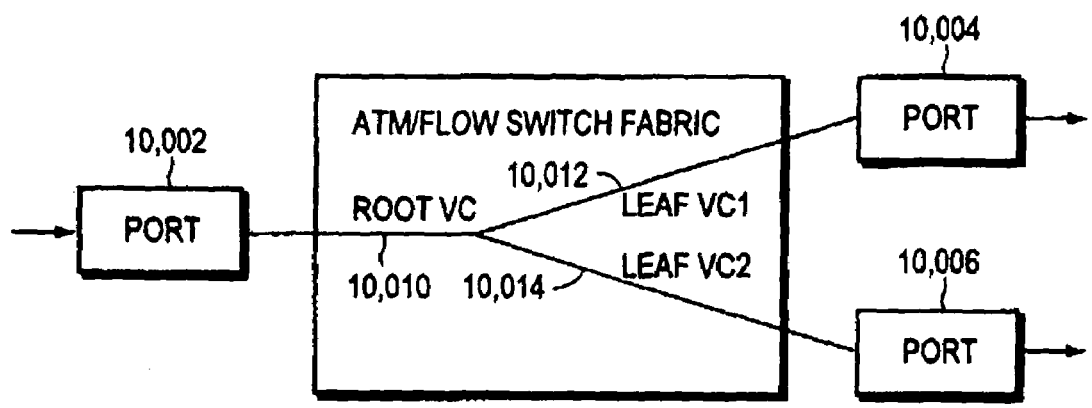
FIG. 10 is a block diagram of a p2mp virtual circuit.

In operation, a packet arrives at a port of a linecard and is transferred into line-card memory M, for example memory 802M. For example, in the event that a packet is received from an external connection at port 802A, the packet arrives at port 802A and is stored in linecard memory unit 802M. Circuits on the linecard interpret the fields of the incoming packet and read the IP SA address in field 304 to obtain the multicast source station S, and read the IP DA field 302 to obtain the multicast group number G. The local line card processor then assists a lookup in the multicast routing table 520 maintained in linecard memory M, for example 802M. In the event that an entry for this S and G combination is found, the packet is routed through point to multipoint virtual circuit, p2mp VC, found in column 530 of multicast routing table 520 for that entry. The packet is transferred through switch fabric 820 to the output ports having a leaf on the p2mp VC, as shown in FIG. 10.

In the event that no entry is found in multicast routing table 520, information is passed to CPU 822. CPU 822 maintains entries in its memory 824 for multi-cast distribution, where the entries have been previously set up using a multicast protocol, such as for example, the PIM protocol. CPU 822 reads the multicast entries in its memory 824 for this multicast source S and group G. CPU 822 then builds the required p2mp VC in switch fabric 820 in accordance with entries in memory 824. The received packet is then routed through this p2mp VC. CPU 822 then updates the routing table 520 maintained in each linecard memory by adding an entry for this S and G combination, along with a reference to the new p2mp VC built in switch fabric 820.

Three dots 809 and 817 indicate that a large number of linecards may be supported by the router. In an alternative embodiment of the invention, each line card may support a plurality of ports, rather than just the one port shown in exemplary router 800.

Figure 9:
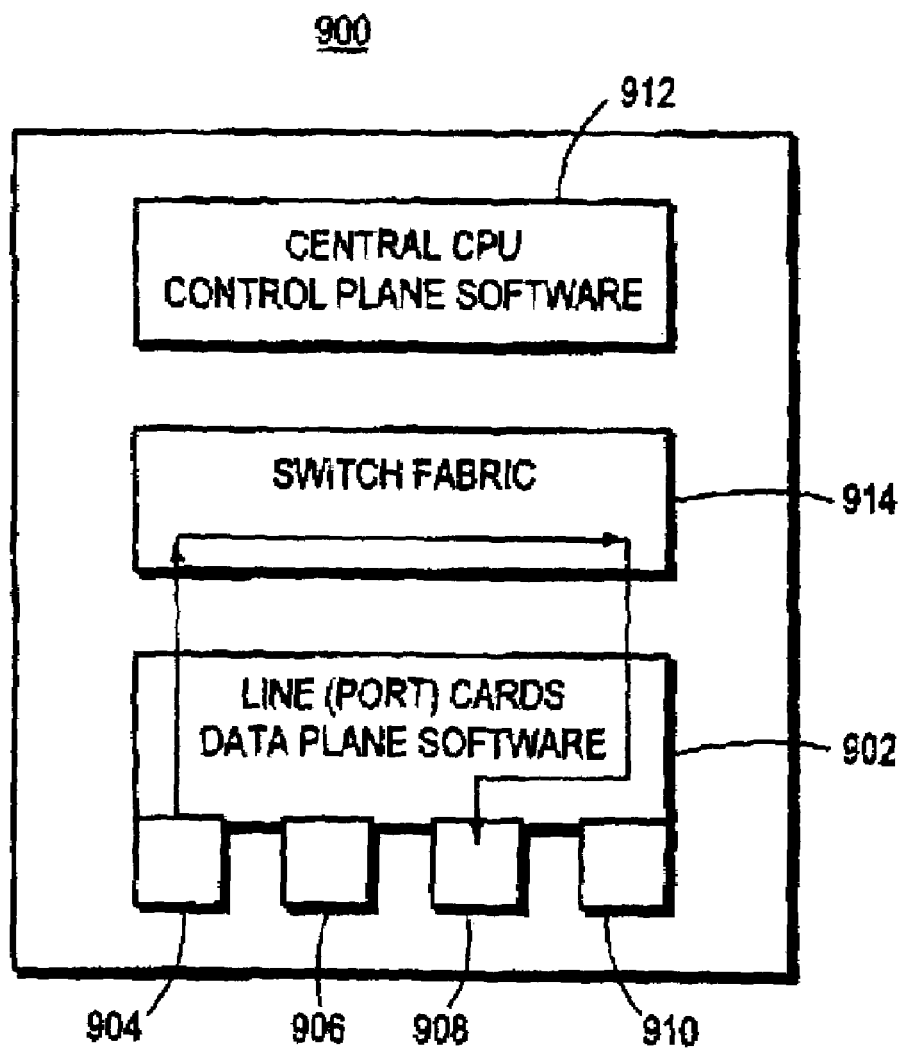
FIG. 9 is a block diagram of software utilized by a router.

Turning now to FIG. 9, a block diagram of software utilized in a typical router is shown, for example, a router as shown in block diagram 800.

Software block diagram 900 shows software operating in linecards, for example, linecards 802, 804, 806, 808, 810, 812, 814, . . . 816 etc., and in processors, such as, for example, linecard processors 802P etc., or central processor CPU 822. Linecard software is shown representatively in block 902. Ports of the linecard are shown representatively as ports 904, 906, 908, . . . 910, etc. CPU software is shown in block 912.

Two types of software are illustrated in block diagram 900 for a router, the control plane software 912, and the data plane software 902. The control plane software of block 912 resides in the central processor CPU 822 and memory 824. The data plane software of block 902 resides in the linecards memory units M and linecard processors P, for example in line card 802 memory 802M and linecard processor 802P.

The data plane software in block 902 assists in look up in multicast routing table 520 in linecard memory M, forwarding packets by using appropriate p2mp VC, and therefore routing packets from an input port to an output port at line speed.

The control plane software in block 912 handles the routing protocols, for example, IP, and IP multicast such as PIM, and other routing protocols. The control plane software includes routines that handle building the point to multipoint virtual circuits, p2mp VC, used in the switch fabric 820.

Turning now to FIG. 10, a point to multipoint virtual circuit, p2mp VC is shown. The incoming port 10,002 receives the incoming packet. The linecards, switch fabric, and CPU implement a virtual circuit. The virtual circuit begins at incoming port 10,002 as root VC 10,010. Leaf virtual circuits are formed to transfer the packet to designated output ports, for example, the two ports, port 1004 and port 1006. Leaf VC 10,012 transfers a packet from root VC 10,010 to output port 10,004. Leaf VC 10,014 transfers a packet from root VC 10,010 to output port 10,006.

For example, as shown in FIG. 10, if data packets need to be routed from incoming port 10,002 to outgoing ports, port 10,004, and port 10,006, a p2mp VC is set up in the switch fabric by the control plane software 912. The VC information is stored in the routing table 520 maintained by the data plane software in the linecard. For p2mp VC flows, there is one route VC for each flow, and one or multiple leaf VC flows. Traffic arrives at the root, input port 10,002, is duplicated by the switch fabric, and is distributed out through the VC leaves, port 10,004, and port 10,006.

Set up of the p2mp VC is next described. When the first multicast data packet with source IP address and destination IP address arrives at input port 10,002, the linecard data plane software 902 forwards the information (IP source address, IP destination address, port number, etc.) to the CPU 822 to be processed by the control plane software 912. The multicast routing information for this traffic flow has already been established by a multicast routing protocol, for example the PIM protocol. The output port list (O-List) has also been established by the multicast routing protocol. Based on the multicast routing protocol, the control plane software decides that this kind of multicast packet with the source and group number (S,G) in the IP addresses fields needs to be forwarded out through port 10,004, and port 10,006. The control plane software 912 then builds a p2mp VC/flow with root being port 10,002 and leaves being port 10,004 and port 10,006 and sends the information to the line card. After that, the data plane software uses this p2mp VC to forward subsequent multicast data packets represented as (S,G).

For example, assume that the root VC 10,010 at port 10,002 is numbered 0/720, and leaf VC 10,004 terminated at port 10,004 is numbered 0/780, and leaf VC 10,014 terminated at port 10,006 is numbered 0/890. The control plane software 912 sends the information (source and destination IP addresses and p2mp VC info) to the outgoing linecards by identifying the outgoing port numbers. This information comprises the primary elements of the multicast routing entry used by the data plane software 902 in forwarding the packet.

When subsequent multicast data packets (same S and G used in setting up the p2mp VC) are received by root input port 10,002, the data plane software 902 responsible for forwarding packets in the linecard examines the source address S read from IP SA field 304, and the group address G read from the IP DA field 302. The data plane software 902 then does a hardware assisted look-up using its multicast routing table 520. In this case, the search finds a match for the receiving port number, IP source address S, and destination address giving the multicast group number G, so it then converts the data packet into internal router packets. For example, routers may use ATM cells as their internal data packets. In this example, the receiving port converts the data packet into ATM cells before sending the packet to the switch fabric 820. Once the cells for the p2mp VC having the assigned receiving port as root port arrive in the switch fabric 820, the hardware duplicates the cells and forwards them out to port 10,004 and port 10,006 as previously set up by the control plane software when the first multi-cast data packet establishing the p2mp VC reached the central CPU control plane software 912. On their way out through port 10,004 and port 10,006, the linecard hardware converts the internal router packets, for example ATM cells, back into the proper data packet format for transmission on the external link connected to the outgoing port.

Figure 11:
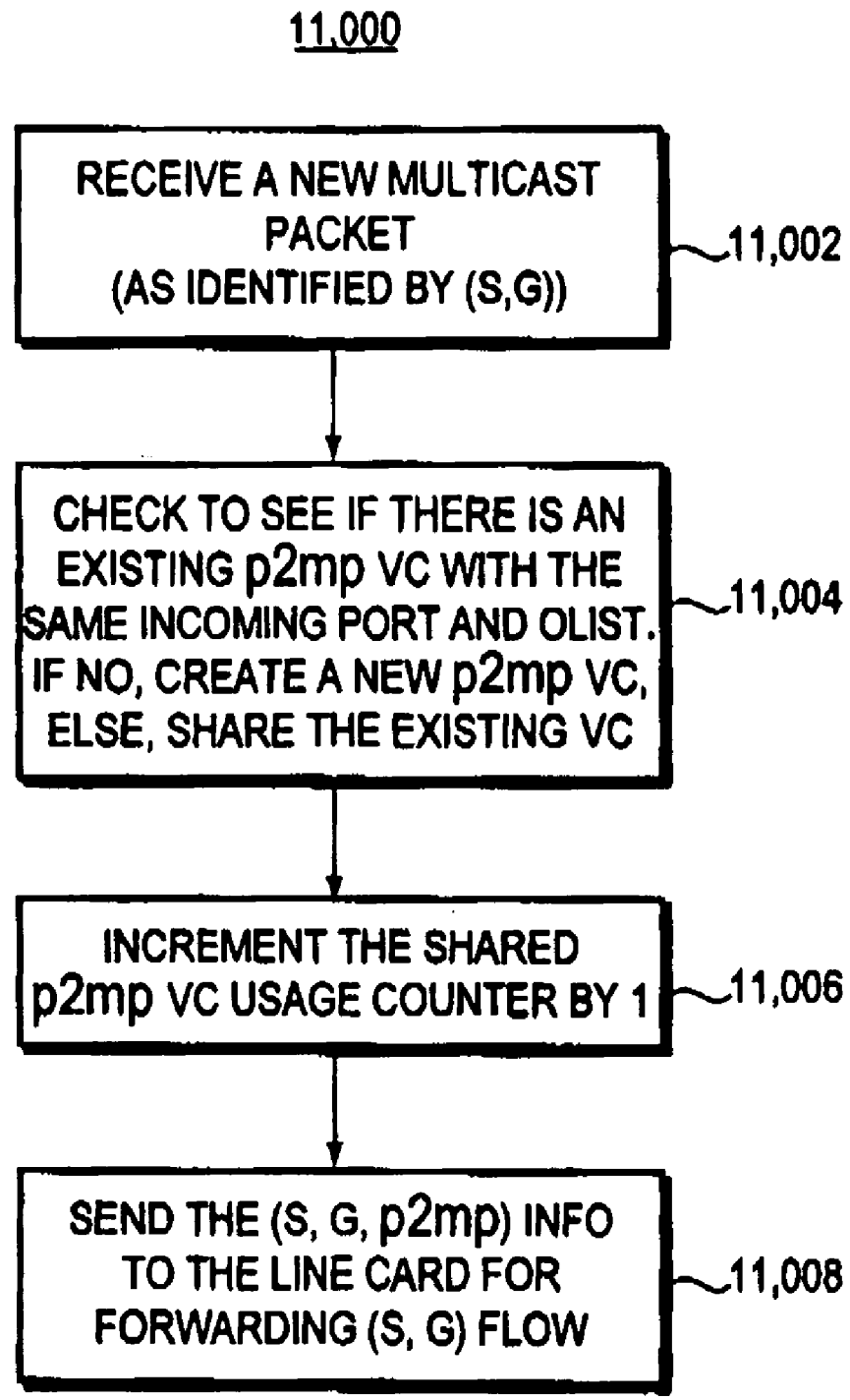
FIG. 11 is a flow diagram of a process to create a new p2mp VC in a router.

Turning now to FIG. 11, flow diagram 11,000 illustrates sharing a single VC as a p2mp VC for flows arriving at the same incoming port and having the same outgoing port address list. That is, a flow (S,G) can share a single p2mp VC/flow as long as the flows arrive at the same incoming port and go to the same outgoing ports. The router circuitry and software is designed to use incoming port number as a designation for the internal virtual circuit, and for this reason it is easier to share virtual circuits among flows arriving at the same incoming receiving port.

At block 11,002 a new multicast packet, as identified by its IP source address, "S" and multicast group number "G", is identified as flow (S,G). After identification of the multicast packet and its flow (S,G), the process goes to block 11,004. At block 11,004 the process checks to see if there is an existing p2mp VC with the same incoming port and outgoing port list (O-List). If no existing p2mp VC with the same incoming port, and O-List is found, the process creates a new p2mp VC. In the event that the check determines that there is an existing p2mp VC with the same incoming port multi-cast group and O-List, then the software shares the existing VC. Upon making this determination, the process goes to block 11,006. At block 11,006 the usage counter for the shared p2mp VC is incremented by one. The process then goes to block 11,008. At block 11,008 the control plane software 912 sends the necessary information to the linecard for forwarding the (S,G) flow. The necessary information includes various parameters, for example, the source IP address, the group address, the incoming port number, and a reference to the O-List for the list of outgoing ports.

Figure 12:
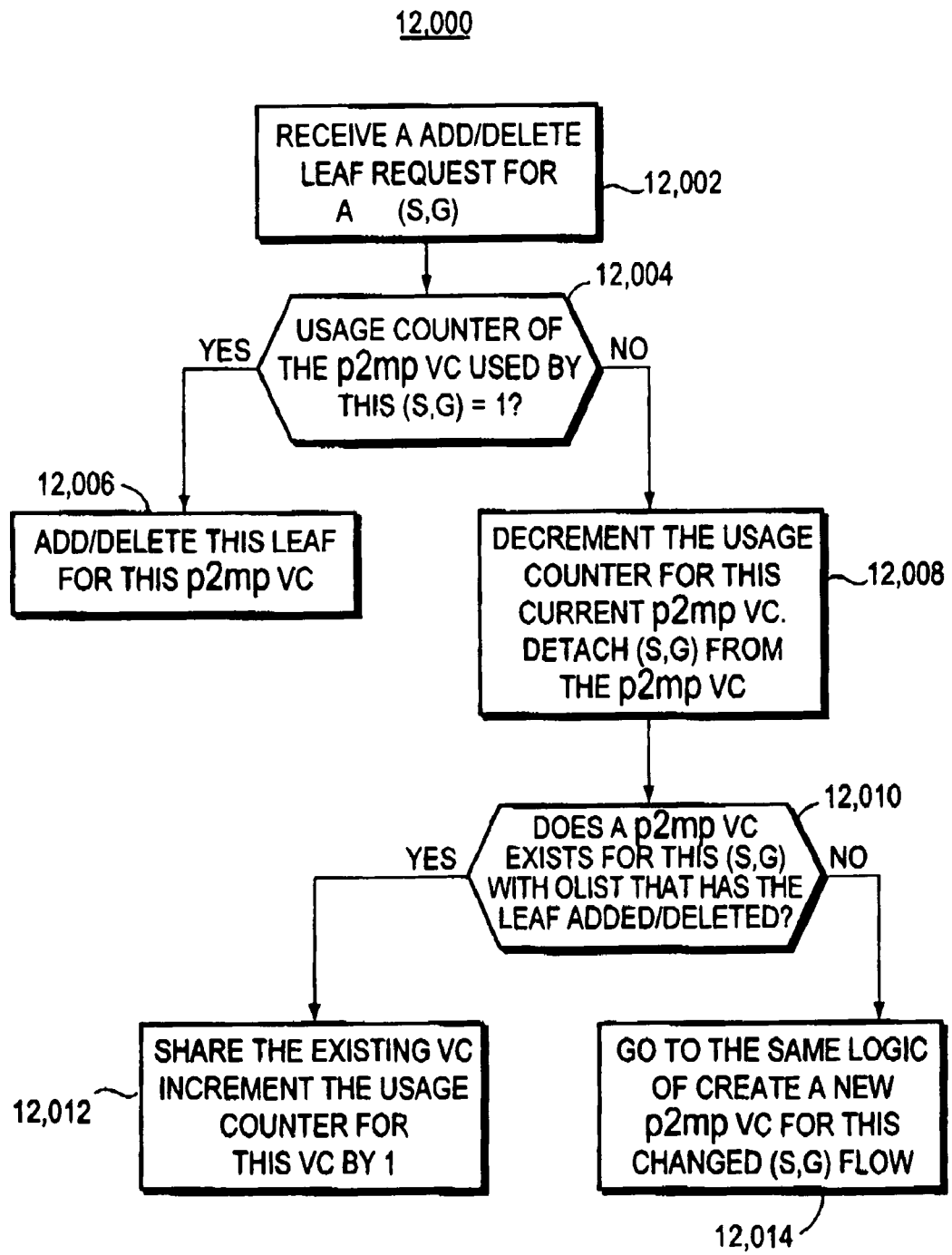
FIG. 12 is a flow diagram of a process to add or delete a leaf in a p2mp virtual circuit.

Turning now to FIG. 12, flow diagram 12,000 illustrates how a particular flow adds or deletes a forwarding leaf to or from its outgoing port list (O-List). At block 12,002 the control plane software 912 receives a request to add or delete a leaf for the (S,G) flow. The process then goes to block 12,004.

At block 12,004 the process checks the usage counter of the p2mp VC used by this (S,G) flow, to determine if the usage counter equals "1". If the usage counter equals "1", the process goes to block 12,006. If the usage counter of this VC is not equal to "1", then the process goes to block 12,008.

At block 12,006 the process adds or deletes this leaf for this particular p2mp VC for the special case that the usage counter equals "1". The process then stops.

At block 12,008 the software decrements the usage counter for this p2mp VC, and detaches or attaches the required leaf for the (S,G) to the p2mp VC virtual circuit. Upon completion of block 12,008 the process goes to block 12,010.

At block 12,010 the process inquires as to whether or not a p2mp VC exists for this (S,G) flow with the O-List that has the leaf added or deleted. If the answer is "yes" the process goes to block 12,012. At block 12,012 the decision is made to share the existing VC and increment the usage counter for this VC by "1". In the event that the test of block 12,010 answers "no", the process goes to block 12,014.

At block 12,014 the process goes to the logic shown in FIG. 11, at block 11,002. Starting with block 11,002 the process then creates a new p2mp VC for the new (S,G) flow with the new O-List, after the leaf has been added or deleted. That is, the new O-List has a leaf either added or deleted, and so a new virtual circuit is established for that new O-List flow.

It is to be understood that the above-described embodiments are simply illustrative of the principles of the invention. Various other modifications and changes may be made by those skilled in the art which embody the principles of the invention and fall within the spirit and scope thereof.

What is claimed is:

1. A method for routing a multicast packet by a router, comprising:

receiving a multicast packet by a router at an input port;

reading a source end station address from the layer 3 field of said packet;

reading a multicast group number from the layer 3 address of said packet;

identifying an output port list in response to said source end station address and said multicast group number; and selecting a point to multipoint virtual circuit that is internal to said router in response to said input port, said multicast group, and said output port list.

2. The method as in claim 1 further comprising:

receiving a second multicast packet with a different source end station address, said multicast group, and said output port list; and selecting said point to multipoint virtual circuit.

3. The method of claim 1 further comprising:

transferring an identification of said point to multipoint virtual circuit to a line card to facilitate routing of said multicast packet.

4. A router for routing multicast packets, comprising:

means for receiving a multicast packet by a router at an input port;

means for reading a source end station address from the layer 3 field of said packet;

means for reading a multicast group number from the layer 3 address of said packet;

means for identifying an output port list in response to said source end station address and said multicast group number; and means for selecting a point to multipoint virtual circuit that is internal to said router in response to said input port, said multicast group, and said output port list.

5. The router as in claim 4 further comprising:

means for reading said multicast group number from a layer 3 destination address field of said packet; and means for reading said source end station address from a layer 3 source address field of said packet.

6. The router as in claim 4 further comprising:

means for transferring an identification of said point to multipoint virtual circuit to a line card to facilitate routing of said multicast packet.

7. A router for routing a multicast packet comprising:

a line card to receive said packet and to read a field indicating that said packet is a multicast packet, and in response to a determination that said packet is a multicast packet, to read a layer 3 source address as a multicast source station, and to read a layer 3 destination address as a multicast group number;

a first circuit to select an output port list in response to said source station and said multicast group;

a second circuit to select a point to multipoint virtual circuit that is internal to said router for routing said packet in response to said output port list and said multicast group; and a replication mechanism to replicate said packet and to transmit said packet through ports listed in said output port list.

8. The router as in claim 7 wherein said first circuit, said second circuit, and said replication mechanism further comprise a central processor unit (CPU).

9. A computer readable media comprising:

said computer readable media having written thereon instructions for execution on a processor for practicing a method for routing a multicast packet by a router, the method having the steps of, receiving a multicast packet by a router at an input port;

reading a source end station address from the layer 3 field of said packet;

reading a multicast group number from the layer 3 address of said packet;

identifying an output port list in response to said source end station address and said multicast group number; and selecting a point to multipoint virtual circuit that is internal to said router in response to said input port, said multicast group, and said output port list.

10. A method for routing a multicast packet by a router, comprising:

receiving said multicast packet by a router;

reading a source end station address from said packet;

reading a multicast group number from said packet;

identifying an output port list in response to said source end station address and said multicast group number; and selecting a point to multipoint virtual circuit that is internal to said router in response to an input port, said multicast group, and said output port list, said point to multipoint virtual circuit routing the multicast packets from an input port to at least one output port.

11. The method as in claim 10, further comprising:

receiving a second multicast packet with a different source end station address, said multicast group, and said output port list; and selecting said point to multipoint virtual circuit.

12. The method of claim 10, further comprising:

transferring an identification of said point to multipoint virtual circuit to a line card to facilitate routing of said multicast packet.

13. A computer readable media comprising:

said computer readable media having written thereon instructions for execution on a processor for practicing a method for routing a multicast packet by a router, the method having the steps of, receiving a multicast packet by a router at an input port;

receiving a multicast packet by a router;

reading a source end station address from said packet;

reading a multicast group number from said packet;

identifying an output port list in response to said source end station address and said multicast group number; and selecting a point to multipoint virtual circuit that is internal to said router in response to an input port, said multicast group, and said output port list, said point to multipoint virtual circuit routing the multicast packets from an input port to at least one output port.

14. A router, comprising:

means for receiving a multicast packet by said router;

means for reading a source end station address from said packet;

means for reading a multicast group number from said packet;

means for identifying an output port list in response to said source end station address and said multicast group number; and means for selecting a point to multipoint virtual circuit that is internal to said router in response to an input port, said multicast group, and said output port list, said point to multi-point virtual circuit routing the multicast packets from an input port to at least one output port.

15. The router as in claim 14, further comprising:

means for receiving a second multicast packet with a different source end station address, said multicast group, and said output port list; and means for selecting said point to multipoint virtual circuit.

16. The router of claim 14, further comprising:
means for transferring an identification of said point to multipoint virtual circuit to a line card to facilitate routing of said multicast packet.

17. A router, comprising:
an I/O card to receive a multicast packet by said router;
a processor to read a source end station address from said packet, and to read a multi-cast group number from said packet; and
a CPU to identify an output port list in response to said source end station address and said multicast group number, and to select a point to multipoint virtual circuit that is internal to said router in response to an input port, said multicast group, and said output port list, said point to multipoint virtual circuit routing the multicast packets from an input port to at least one output port.

18. The router as in claim 17, further comprising:
said I/O card to receive a second multicast packet with a different source end station address, said multicast group, and said output port list; and
said CPU to select said point to multipoint virtual circuit.

19. The router of claim 17, further comprising:
said CPU to transfer an identification of said point to multipoint virtual circuit to a line card to facilitate routing of said multicast packet.

20. A method for routing a multicast packet by a router, comprising the steps of
receiving the multicast packet at an input port of a line card of the router, the packet having a source end station address;
determining an output port list for the multicast packet, the output port list including a plurality of output ports of the router on which the packet is to be forwarded;
if there is an existing point to multipoint virtual circuit beginning at the input port of the line card and terminating at the plurality of output ports, associating the multicast packet with the existing point to multipoint virtual circuit, regardless of the multicast packet's source end station address; and
if there is not an existing point to multipoint virtual circuit beginning at the input port of the line card and terminating at the plurality of output ports, creating a new point to multi-point virtual circuit and associating the multicast packet with the new point to multipoint virtual circuit.

21. The method of claim 20 further comprising the step of:
incrementing a usage counter for the existing point to multipoint virtual circuit in response to associating the multicast packet with the existing point to multipoint virtual circuit.

22. The method of claim 20 further comprising the step of:
transferring an identification of the existing point to multipoint virtual circuit to the line card to facilitate routing of said multicast packet.

23. A router for routing a multicast packet comprising
a line card to receive a multicast packet having a source end station address;
a first circuit configured to determine an output port list for the multicast packet, the output port list including a plurality of output ports of the router on which the packet is to be forwarded; and
a second circuit configured to,
if there is an existing point to multipoint virtual circuit beginning at the input port of the line card and terminating at the plurality of output ports, associate the multicast packet with the existing point to multipoint virtual circuit, regardless of the multicast packet's source end station address; and
if there is not an existing point to multipoint virtual circuit beginning at the input port of the line card and terminating at the plurality of output ports, create a new point to multipoint virtual circuit and associate the multi-cast packet with the new point to multipoint virtual circuit.

24. The router of claim 23 further comprising:
a usage counter for counting a number of multicast packets associated with the existing point to multipoint virtual circuit.

25. The router of claim 23 wherein said first circuit and said second circuit are a central processor unit (CPU).

26. A computer readable medium containing executable program instructions for routing a multicast packet, the executable program instructions comprising program instructions for:
receiving the multicast packet at an input port of a line card of the router, the packet having a source end station address;
determining an output port list for the multicast packet, the output port list including a plurality of output ports of the router on which the packet is to be forwarded;
if there is an existing point to multipoint virtual circuit beginning at the input port of the line card and terminating at the plurality of output ports, associating the multicast packet with the existing point to multipoint virtual circuit, regardless of the multicast packet's 11 source end station address; and
if there is not an existing point to multipoint virtual circuit beginning at the input port of the line card and terminating at the plurality of output ports, creating a new point to multi-point virtual circuit and associating the multicast packet with the new point to multipoint virtual circuit.

\* \* \* \* \*